June 2, 1970 J. F. NUCCIO 3,515,608
PROCESS FOR INSULATING THE JOINTS OF ELECTRICAL CONDUCTORS
Filed Oct. 24, 1966
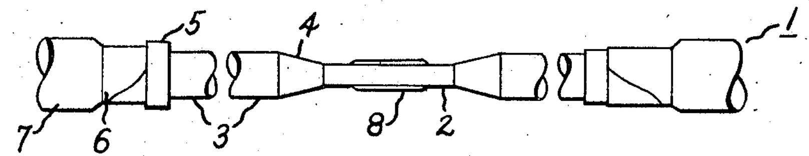
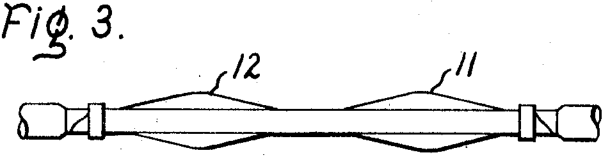
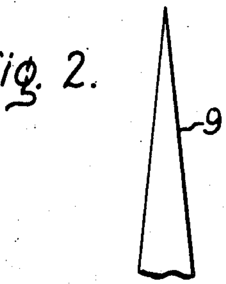
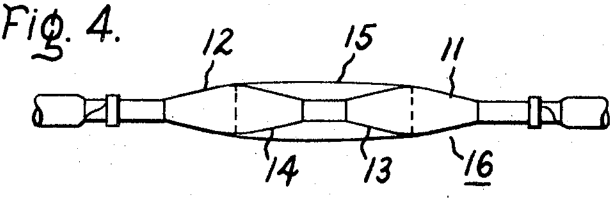
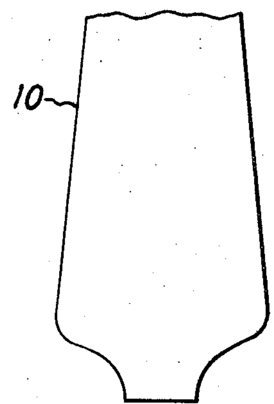
Fig. 5.
17
Fig. 6.
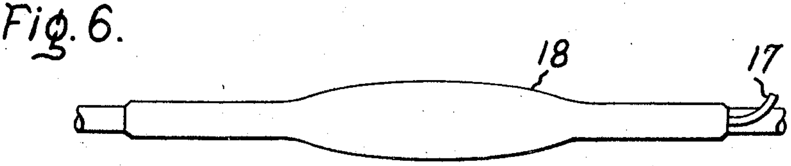
Inventor:
Joseph F. Nuccio,
by Howard I. Schlansker
His Attorney United States Patent Office 3,515,608

Patented June 2, 1970

3,515,608

PROCESS FOR INSULATING THE JOINTS OF ELECTRICAL CONDUCTORS

Joseph F. Nuccio, Ballston Spa, N.Y., assignor to General Electric Company, a corporation of New York Filed Oct. 24, 1966, Ser. No. 588,902
Int. Cl. H01r *43/00*
U.S. Cl. 156—49 2 Claims

ABSTRACT OF THE DISCLOSURE

This invention relates to an improved process for insulating the joints of electric conductors, cables and the like and to conductor joints so made. More particularly, the invention relates to preparing joints of high voltage, high tension or high potential electrical conductors in which the electrical stress-relief at the cable shields includes at the ends two regularly spaced tapering electrical stress-relief cones, the intervening space between said stress-relief cones being electrically reinforced with reversely disposed stress cones and regularly disposed stress cones, all of said stress cones being fabricated from preformed, generally pennant shaped strips of electrical insulating material.

The art of insulating the joints of high tension electrical conductors or cables to reduce electrical stresses occurring at such joints and more particularly at the edges of the shields of cables being joined has been highly developed. Generally speaking, when such cable joints are made, the cable insulation, any semiconducting material which may be present, electrical shielding material, and the cable jacket are stripped back from the ends of the cables to be joined for a distance which is dependent upon the cable voltage rating. Typically, the abutted ends of the bared cable conductors are joined together with a metallic connector ferrule or bushing which can be soldered or sweated in place or affixed to the cable in any other suitable manner as by compression or clamping. Any irregularities presented by the connector are filled in with an insulating putty or tape and the space left by removed material replaced with insulation. Electrical reinforcement of the joint and reduction of electric stress is sometimes provided by hand taping insulating tape in the usual manner over the joint area and adjoining cable insulation to present a generally tubular configuration tapered at the ends which is designed to withstand the particular electrical stresses to be encountered. Suitable shielding is provided over this electrical reinforcement and joined to the shielding of the cable, this shield usually being grounded upon installation. The over-all insulated, shielded and grounded cable joint is then overlaid with a suitable cover as desired to provide mechanical protection and moisture sealing capabilities.

The use of ordinary tape in preparing such joints leaves much to be desired since the application of such tape in the proper overlapped manner is a tedious, time-consuming operation which requires considerable skill on the part of the operator.

An improvement in the above method of making cable joints can be realized by making the electrical stress-relief and reinforcement structure from a generally pennant shaped piece of tape. Generally, the wide end of such a pennant shaped tape is applied over the connector portion of the joint and the tape wound smoothly on itself to progressively form a stress-relief and electrical reinforcement structure of proper configuration. Such a pennant-shaped tape is shown, for example, in U.S. Pats. 1,776,127 and 1,987,971. A modified pennant-shaped tape is shown in Pat. 1,642,514. Various shapes to accomplish a desired configuration can be made. These specially shaped tapes can be much more readily applied than ordinary overlapped turns of tape and by relatively inexperienced operators, the finished structure being solid and obviating the disadvantages of ordinary overlapped taped structures.

However, it has been found that even such a pennant has its limitations. For example, in cables operating at over 5 kv., a single pennant of suitable width could not be applied with reliability. While a pennant shaped tape presents definite advantages over the ordinary overlapped tapes, it will be appreciated that particularly in the hands of relatively inexperienced operators, when the larger width of the pennant shaped tape exceeds about six inches, its application to provide a smooth, wrinkle-free, self-centering surface becomes quite difficult and the provision of single pennant widths necessary to provide correct electrical dimensions in the higher rated cable joints is, from a practical point of view, almost impossible.

A primary object of the present invention is to provide for improved and readily applied electrical stress-relief and reinforcement structures for high tension electrical conductor joints.

Another object of the invention is to provide such electrical stress-relief and reinforcement structures wherein pennant shaped tapes are applied in regularly wound fashion to provide at the ends of the structure the usual sloping or tapering stress-relief configuration, the required space between such end structures being filled with reverse wound and normally wound pennant shaped taped structures as indicated.

Briefly, the invention relates to a process for insulating the joints of high tension electrical cables and to insulated cable joints so prepared wherein pennant shaped tapes are used to provide the electrical stress-relief and reinforcement structure, the ends of the structure being provided by pennant shaped tapes regularly or normally wound with their wider ends adjacent the cable to provide electrical stress relief, the intervening space between such end structure being filled by reverse wound pennants (or with the narrow end adjacent the cable) and regularly wound pennant tapes as required to provide electrical reinforcement.

Those features of the invention which are believed to be novel are set forth with particularity in the claims appended hereto. The invention will, however, be better understood from a consideration of the following description and the drawing in which FIG. 1 shows a typical cable joint with connector in place and before insulation. FIG. 2 shows a typical pennant shaped tape of the present invention; FIG. 3 shows the joint of FIG. 1 with the electrical stress-relief pennants wound in place; FIG. 4 shows the reverse wound center pennant in place; FIG. 5 shows the joint with shielding and ground lead in place; and FIG. 6 shows the completed joint with the overlying cover in place.

Referring to the drawing, there is shown in FIG. 1 a high tension electrical conductor joint 1, before insulation having conductor portions 2 abutted as shown, the insulation 3 for each conductor being pencilled or tapered down as at 4, the semiconducting layer 5 being folded back over the metallic shield 6 toward the cable jacket 7. A connector 8 of any usual type as described above is used to join the abutted ends of the conductors. As pointed out above, this connector may be sweated or soldered on preferably using a minimum of heat so as not to cause deterioration of any insulation or it may be of the compression or clamped type. Next, a tape preferably of any usual semiconducting type is applied over the connector. Usually one half-lapped layer of such tape is sufficient. Over this semiconducting layer, insulating tape is applied to the diameter of the insulation 3, presenting a smooth periphery.

In order to provide electrical stress-relief at the cable shields, a generally pennant shaped tape shown as at 10 in FIG. 2 is used. The configuration shown is typical or representative only, it being realized that it may be made in any shape or size to suit a particular application. This tape is wrapped over each of the cable joint as shown in FIG. 3 in regular manner with its wide end inward and its narrow end outward to provide two spaced electrical stress-relief cones 11 and 12. In a typical 9 to 15 kv. cable, the electrical stress-relief cones are about six inches long at the base and are spaced one from the other by a distance of about three inches. It will be realized at once by those skilled in the art that to prepare an electrical stress-relief and reinforcement structure of the width shown using only one tapered or pennant shaped tape of about 15 inches maximum width would be impossible from a practical point of view because of the difficulty of laying down such a wide tape in a smooth fashion without wrinkles even by a skilled operator. However, it has been found that pennants of the six inch widths used for the end portions are very readily applied. Next, there is applied between the two electrical stress-relief cones 11 and 12 a reverse wound truncated pennant of suitable size and shape, that is, one wound with the narrow three inch end inward and the wider end outward, this pennant being designed to essentially mate with the inward sloping portions 13 and 14 of stress-relief cones 11 and 12. With the third pennant in place or entirely wound, there is provided a central electrical reinforcement portion 15 to provide a complete insulated joint 16 having parts 11, 12 and 15.

To complete the joint there is wound about the outer periphery of the electrical stress-relief and reinforcement structure a metal ground lead 17 of the usual type as shown in FIG. 5. This ground tape or lead is normally underlaid by one or more layers of semiconductive tape of the usual type to provide electrostatic shielding of the joint.

To provide final protection for the cable joint against the elements and outside mechanical influences, a covering 18 tape can be wound about the ground lead to present a final joint configuration shown in FIG. 6.

While in the particular example shown three pennants are used, it will be realized that with cables operating at higher potentials, any number of such abutting pennants can be used, the end pennants being regularly wound to provide tapering or sloping electrical stress-relief surfaces at the ends of the joint with the intervening space being filled by alternately reverse wound pennants and regularly wound pennant tapes as needed to provide electrical reinforcement. Thus, five to seven such pennants properly wound as taught are used for conductor joints operated under potentials of from about 25 kv. to 35 kv.

In the specific structure illustrated by example, the various wrapping materials have a synthetic or natural rubber base. For example, the semiconductive material is a filled natural or synthetic rubber. Materials having similar bases are useful for the pennant shaped tapes. General Electric 8380, a butyl rubber based self-amalgamating material, is efficacious in such role. It will be realized, of course, that in the case of cables insulated by other means as by paper, cloth and the like, the pennants can also be made of corresponding materials.

When subjected to the usual electrical tests, the cable joints of the present invention have been found to be equivalent or superior to joints wound with usual tape in an overlapped fashion. They are, of course, applied in a much shorter time by relatively unskilled operators.

What I claim as new and desire to secure by Letters Patent of the United States is:

1. The process of protecting a high tension cable joint by forming over said joint a stress-relief and electrical reinforcement structure which includes forming said structure by sequentially winding over said joint area at least three pennant shaped lengths of tape to provide stress-relief tapers at the ends thereof and a generally cylindrical central portion.

2. The process of electrically protecting a high voltage cable joint which comprises providing over the insulation for said joint regularly sequentially wound pennant shaped tapes with their wide ends adjacent said insulation to provide tapered stress-relief extremities, the intervening space being filled by reverse wound and regularly wound pennant shaped tapes as required to fill said space.

References Cited

UNITED STATES PATENTS 3,017,306 1/1962 Priaroggia ---------- 156—48
3,361,605 2/1968 Gilbert ------------ 156—48

FOREIGN PATENTS 612,059 11/1948 Great Britain.
740,748 11/1955 Great Britain.

VERLIN R. PENDEGRASS, Primary Examiner

U.S. Cl. X.R.

174—73, 84